(12) United States Patent
Zhou et al.

(10) Patent No.: US 10,958,925 B2
(45) Date of Patent: *Mar. 23, 2021

(54) DENSE VIDEO CAPTIONING

(71) Applicant: salesforce.com, inc., San Francisco, CA (US)

(72) Inventors: Yingbo Zhou, San Jose, CA (US); Luowei Zhou, Ann Arbor, MI (US); Caiming Xiong, Menlo Park, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,405

(22) Filed: Nov. 18, 2019

(65) Prior Publication Data
US 2020/0084465 A1 Mar. 12, 2020

Related U.S. Application Data

(63) Continuation of application No. 15/874,515, filed on Jan. 18, 2018, now Pat. No. 10,542,270.
(Continued)

(51) Int. Cl.
*H04N 19/46* (2014.01)
*H04N 19/44* (2014.01)
(Continued)

(52) U.S. Cl.
CPC .......... *H04N 19/46* (2014.11); *H04N 19/126* (2014.11); *H04N 19/132* (2014.11);
(Continued)

(58) Field of Classification Search
CPC .......... H04N 7/12; H04N 11/12; H04N 11/04; H04N 7/00; H04N 19/46; H04N 19/126;
(Continued)

(56) References Cited

U.S. PATENT DOCUMENTS 8,036,473 B1 10/2011 Ratto et al.
8,121,367 B2 2/2012 Socher et al.
(Continued)

OTHER PUBLICATIONS

J.-B. Alayrac, P. Bojanowski, N. Agrawal, J. Sivic, I. Laptev, and S. Lacoste-Julien. Unsupervised learning from narrated instruction videos. In CVPR, pp. 4575-4583, 2016.
(Continued)

*Primary Examiner* — Trang U Tran
(74) *Attorney, Agent, or Firm* — Haynes and Boone, LLP

(57) ABSTRACT

Systems and methods for dense captioning of a video include a multi-layer encoder stack configured to receive information extracted from a plurality of video frames, a proposal decoder coupled to the encoder stack and configured to receive one or more outputs from the encoder stack, a masking unit configured to mask the one or more outputs from the encoder stack according to one or more outputs from the proposal decoder, and a decoder stack coupled to the masking unit and configured to receive the masked one or more outputs from the encoder stack. Generating the dense captioning based on one or more outputs of the decoder stack. In some embodiments, the one or more outputs from the proposal decoder include a differentiable mask. In some embodiments, during training, error in the dense captioning is back propagated to the decoder stack, the encoder stack, and the proposal decoder.

19 Claims, 9 Drawing Sheets

Related U.S. Application Data

(60) Provisional application No. 62/586,866, filed on Nov. 15, 2017.

(51) Int. Cl.
*H04N 19/60* (2014.01)
*H04N 19/187* (2014.01)
*H04N 21/81* (2011.01)
*H04N 19/33* (2014.01)
*H04N 19/126* (2014.01)
*H04N 19/132* (2014.01)
H04N 21/488 (2011.01)

(52) U.S. Cl.
CPC ........... *H04N 19/187* (2014.11); *H04N 19/33* (2014.11); *H04N 19/44* (2014.11); *H04N 19/60* (2014.11); *H04N 21/8126* (2013.01); *H04N 21/4884* (2013.01)

(58) Field of Classification Search
CPC .... H04N 19/132; H04N 19/187; H04N 19/33; H04N 19/44; H04N 19/60; H04N 21/4884; H04N 21/8126
USPC .............. 375/240.12; 348/473; 382/157, 103
See application file for complete search history.

(56) References Cited

U.S. PATENT DOCUMENTS

| | | | |
|---|---|---|---|
| 8,326,051 | B1 | 12/2012 | Hobbs |
| 8,355,550 | B2 | 1/2013 | Zhang et al. |
| 9,965,705 | B2* | 5/2018 | Chen ........................ G06N 5/04 |
| 10,198,671 | B1 | 2/2019 | Yang et al. |
| 10,225,582 | B1 | 3/2019 | Ananthanarayanan et al. |
| 10,282,663 | B2 | 5/2019 | Socher et al. |
| 10,346,721 | B2 | 7/2019 | Albright et al. |
| 10,467,274 | B1* | 11/2019 | Ren ........................ G06K 9/4604 |
| 10,565,493 | B2 | 2/2020 | Merity et al. |
| 2016/0350653 | A1 | 12/2016 | Socher et al. |
| 2017/0024645 | A1 | 1/2017 | Socher et al. |
| 2017/0032280 | A1 | 2/2017 | Socher |
| 2017/0140240 | A1 | 5/2017 | Socher et al. |
| 2017/0366199 | A1 | 12/2017 | Ge et al. |
| 2018/0082171 | A1 | 3/2018 | Merity et al. |
| 2018/0096219 | A1 | 4/2018 | Socher et al. |
| 2018/0096267 | A1 | 4/2018 | Masekara et al. |
| 2018/0101768 | A1 | 4/2018 | Laine et al. |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |
| 2018/0268287 | A1 | 9/2018 | Johansen et al. |
| 2018/0268298 | A1 | 9/2018 | Johansen et al. |
| 2018/0300317 | A1 | 10/2018 | Bradbury |
| 2018/0300400 | A1 | 10/2018 | Paulus |
| 2018/0336198 | A1 | 11/2018 | Zhong et al. |
| 2018/0336453 | A1 | 11/2018 | Merity et al. |
| 2018/0349359 | A1 | 12/2018 | McCann et al. |
| 2018/0373682 | A1 | 12/2018 | McCann et al. |
| 2018/0373987 | A1 | 12/2018 | Zhang et al. |
| 2019/0108432 | A1 | 4/2019 | Lu et al. |
| 2019/0108439 | A1 | 4/2019 | Lu et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0188568 | A1 | 6/2019 | Keskar et al. |
| 2019/0213482 | A1 | 7/2019 | Socher et al. |
| 2019/0251168 | A1 | 8/2019 | McCann et al. |
| 2019/0251431 | A1 | 8/2019 | Keskar et al. |
| 2019/0258714 | A1 | 8/2019 | Zhong et al. |
| 2019/0258901 | A1 | 8/2019 | Albright et al. |
| 2019/0258939 | A1 | 8/2019 | Min et al. |

OTHER PUBLICATIONS

J. L. Ba, J. R. Kiros, and G. E. Hinton. Layer normalization. arXiv preprint arXiv:1607.06450, 2016.

D. Bandanau, K. Cho, and Y. Bengio. Neural machine translation by jointly learning to align and translate. arXiv preprint arXiv: 1409.0473, 2014.

S. Bengio, 0. Vinyals, N. Jaitly, and N. Shazeer. Scheduled sampling for sequence prediction with recurrent neural networks. In NIPS, pp. 1171-1179, 2015.

S. Buch, V. Escorcia, C. Shen, B. Ghanem, and J.C. Niebles. Sst: Single-stream temporal action proposals. In CVPR, pp. 2911-2920, 2017.

P. Das, C. Xu, R. F. Doell, and J. J. Corso. A thousand frames in just a few words: Lingual description of videos through latent topics and sparse object stitching. In Proceedings of IEEE Conference on Computer Vision and Pattern Recognition, 2013.

J. Donahue, L. Anne Hendricks, S. Guadarrama, M. Rohrbach, S. Venugopalan, K. Saenko, and T. Darrell. Long-term recurrent convolutional networks for visual recognition and description. In CVPR, pp. 2625-2634. 2015.

V. Escorcia, F. C. Heilbron, J.C. Niebles, and B. Ghanem. Daps: Deep action proposals for action understanding. In ECCV, pp. 768-784. 2016.

Y. Gal and Z. Ghahramani. A theoretically grounded application of dropout in recurrent neural networks. In NIPS, pp. 1019-1027. 2016.

Z. Gan, C. Gan, X. He, Y. Pu, K. Tran, J. Gao, L. Carin, and L. Deng. Semantic compositional networks for visual captioning. CVPR. 2017.

J. Gao, Z. Yang, C. Sun, K. Chen, and R. Nevatia. Tum tap: Temporal unit regression network for temporal action proposals. ECCV, 2017.

B. Ghanem, J. C. Niebles, C. Snoek, F. Caba Heilbron, H. Alwassel, R. Khrisna, V. Escorcia, K. Hata, and S. Buch. Activitynet challenge 2017 summary. arXiv preprintarXiv:1710.08011, 2017.

R. Girshick. Fast r-cnn. In Proceedings of the IEEE international conference on computer vision, pp. 1440-1448, 2015.

A. Graves and J. Schmidhuber. Framewise phoneme classification with bidirectional lstm and other neural network architectures. Neural Networks, 18(5): 8 pages, 2005.

K. He, X. Zhang, S. Ren, and J. Sun. Deep residual learning for image recognition. In CVPR, pp. 770-778, 2016.

F. C. Heilbron, W. Barrios, V. Escorcia, and B. Ghanem. SCC: Semantic context cascade for efficient action detection, CVPR, pp. 1454-1463.

S. Hochreiter and J. Schmidhuber. Long short-term memory. Neural computation, 9(8):1735-1780, 1997.

S. Ioffe and C. Szegedy. Batch normalization: Accelerating deep network training by reducing internal covariate shift. In ICML, 11 pages, 2015.

R. Krishna, K. Hata, F. Ren, L. Fei-Fei, and J. C. Niebles. Dense-captioning events in videos. ICCV, 2017.

H. Kuehne, A. Arslan, and T. Serre. The language of actions: Recovering the syntax and semantics of goal-directed human activities. In CVPR, pp. 780-787, 2014.

Z. Lin, M. Feng, C. N. d. Santos, M. Yu, B. Xiang, B. Zhou, and Y. Bengio. A structured self-attentive sentence embedding. arXiv preprint arXiv:1703.03130. 2017.

Y. Pan, T. Yao, H. Li, and T. Mei. Video captioning with transferred semantic attributes. CVPR, 2017.

Pascanu et al., "On the difficulty of training recurrent neural networks." In ICML, pp. 1310-1318.

(56) References Cited

OTHER PUBLICATIONS

Paulus et al., "A deep reinforced model for abstractive summarization." arXiv preprint arXiv:1705.04304. 2017.
Ren et al., "Faster r-cun: Towards real-time object detection with region proposal networks." In NIPS, pp. 91-99. 2015.
S. J. Rennie, E. Marcheret, Y. Mroueh, J. Ross, and V. Goel. Self-critical sequence training for image captioning. arXiv preprintarXiv:1612.00563, 2016.
Z. Shou, D. Wang, and S.-F. Chang. Temporal action localization in untrimmed videos via multi-stage cuns. In CVPR, pp. 1049-1058, 2016.
K. Simonyan and A. Zisserman. Very deep convolutional networks for large-scale image recognition. arXiv preprint arXiv:1409.1556, 2014.
A. Vaswani, N. Shazeer, N. Parmar, J. Uszkoreit, L. Jones, A. N. Gomez, L. Kaiser, and I. Polosukhin. Attention is all you need. NIPS, 2017.
S. Venugopalan, M. Rohrbach, J. Donahue, R. Mooney, T. Darrell, and K. Saenko. Sequence to sequence-video to text. In ECCV, pp. 4534-4542, 2015.
S. Venugopalan, H. Xu, J. Donahue, M. Rohrbach, R. Mooney, and K. Saenko. Translating videos to natural language using deep recurrent neural networks. arXiv preprint arXiv:1412.4729, 2014.
0. Vinyals, A. Toshev, S. Bengio, and D. Erhan. Show and tell: A neural image caption generator. In CVPR, pp. 3156-3164, 2015.
Y. Xiong, L. Wang, Z. Wang, B. Zhang, H. Song, W. Li, D. Lin, Y. Qiao, L. Van Gool, and X. Tang. Cuhk & ethz & siat submission to activitynet challenge 2016. arXiv preprint arXiv:1608.00797, 2016.
K. Xu, J. Ba, R. Kiros, K. Cho, A. Courville, R. Salakhudinov, R. Zemel, and Y. Bengio. Show, attend and tell: Neural image caption generation with visual attention. In ICML, pp. 2048-2057, 2015.
L. Yao, A. Torabi, K. Cho, N. Ballas, C. Pal, H. Larochelle, and a. Courville. Describing videos by exploiting temporal structure. In CVPR, 2015.
T. Yao, Y. Pan, Y. Li, Z. Qiu, and T. Mei. Boosting image captioning with attributes. ECCV, 2017.
Q. You, H. Jin, Z. Wang, C. Fang, and J. Luo. Image captioning with semantic attention. In CVPR, pp. 4651-4659, 2016.
H. Yu, N. Siddharth, A. Barbu, and J. M. Siskind. A compositional framework for grounding language inference, generation, and acquisition in video. J. Artif. Intell. Res.(JAIR), 52:601-713, 2015.
H. Yu and J.M. Siskind. Grounded language learning from video described with sentences. In ACL (1), pp. 53-63, 2013.
H. Yu, J. Wang, Z. Huang, Y. Yang, and W. Xu. Video paragraph captioning using hierarchical recurrent neural networks. CVPR, 2016.
K. Zhang, W.-L. Chao, F. Sha, and K. Grauman. Video summarization with long short-term memory. In ECCV, pp. 766-782. Springer, 2016.
L. Zhou, C. Xu, and J. J. Corso. Towards automatic learning of procedures from web instructional videos. AAAI, 2018.
L. Zhou, C. Xu, P. Koch, and J. J. Corso. Watch what you just said: Image captioning with text-conditional attention. arXiv preprint arXiv:1606.04621, 2016.

* cited by examiner

| Method | Average Recall (%) |
|---|---|
| ProcNets-prop | 47.01 |
| Bi-LSTM | 50.65 |
| Transformer | 52.95 |

| Method | B@3 | B@4 | M |
|---|---|---|---|
| Bi-LSTM +TempoAttn | 4.8 | 2.1 | 9.97 |
| Masked Trans. | | | |
| 1-layer | 5.80 | 2.66 | 10.92 |
| 2-layer | 5.69 | 2.67 | 11.06 |
| 4-layer | 5.70 | 2.77 | 11.11 |
| 6-layer | 5.66 | 2.71 | 11.10 |

FIG. 9

| Method | GT proposals | | learned proposals | |
|---|---|---|---|---|
| | B@4 | M | B@4 | M |
| Bi-LSTM +TempoAttn | 0.93 | 8.59 | 0.08 | 4.62 |
| Transformer | 1.29 | 10.38 | 0.30 | 6.58 |

FIG. 10

| Method | GT proposals | | learned proposals | |
|---|---|---|---|---|
| | B@4 | M | B@4 | M |
| Bi-LSTM +TempoAttn | 0.84 | 5.39 | 0.42 | 3.99 |
| Transformer | 1.13 | 5.90 | 1.04 | 5.93 |

FIG. 11

DENSE VIDEO CAPTIONING

RELATED APPLICATIONS

This application is a continuation of U.S. patent application Ser. No. 15/874,515 filed Jan. 18, 2018 and claims priority to U.S. Provisional Patent Application Ser. No. 62/586,866 filed on Nov. 15, 2017 entitled "Systems and Methods for Dense Video Captioning", which are incorporated by reference in their entirety.

TECHNICAL FIELD

The present disclosure relates generally to the generation of dense captions for video samples.

BACKGROUND

Video has become an important source for humans to perceive visual information and acquire knowledge (e.g., video lectures, making sandwiches, changing tires, and/or the like). Video content consumes high cognitive bandwidth, and is often slow for a human to digest. To efficiently acquire information from video, it is helpful to provide a description of the video content so that it is easier and faster for humans to understand. This is particularly important given the massive amount of video being produced every day.

Accordingly, it would be advantageous to have systems and methods for generating dense captions for video.

BRIEF DESCRIPTION OF THE DRAWINGS

FIGS. 9-11 are tables and charts showing improved performance for caption generation according to some embodiments.

In the figures, elements having the same designations have the same or similar functions.

DETAILED DESCRIPTION

Dense captioning for video is one way to make video content easier and faster for humans to understand, by describing events in the video with descriptive natural language. For example, a dense video captioning system could review a video showing a dish being cooked, identify events corresponding to the steps for preparing the dish (e.g., preparing ingredients, cooking the dish, etc.), and generate a descriptive caption for each of the events. In another example, a dense video captioning system could automatically generate descriptive captions for video segments that could serve as descriptions for the content of the video so that a viewer could get a general idea of the content of the video without having to watch the video.

Figure 1:
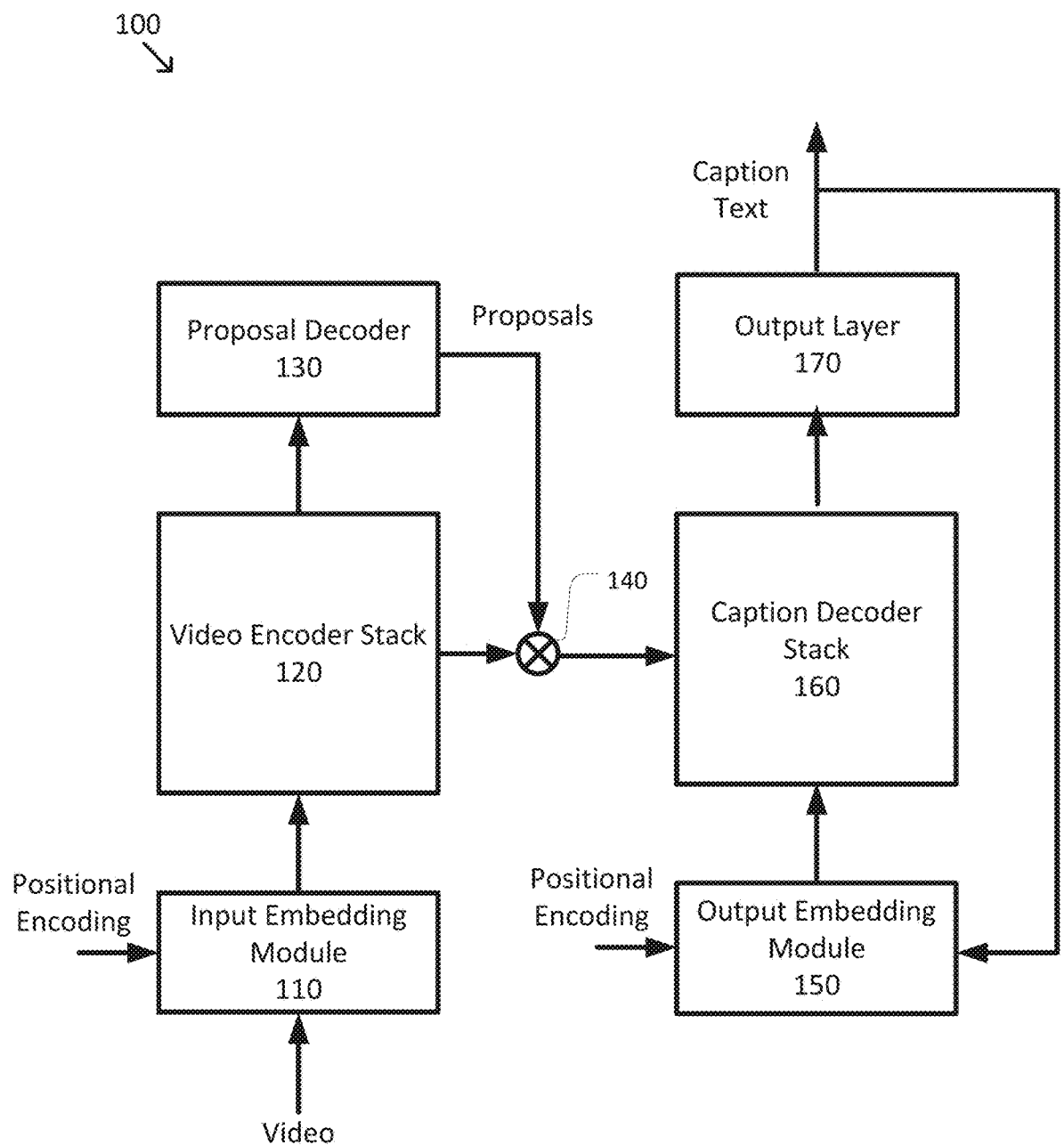
FIG. 1 is a simplified diagram of a dense video captioning system according to some embodiments.

FIG. 1 is a simplified diagram of a dense video captioning system 100 according to some embodiments. In some embodiments, dense video captioning system 100 may be considered dense because it is capable of providing captioning for videos of lengths lasting 10 minutes or more and/or for videos including multiple events, with each of the multiple events corresponding to a separate caption that is to be generated. As shown in FIG. 1, dense video captioning system 100 receives a multi-frame video at an input embedding module 110. Input embedding module 110 includes several sub-modules for preparing the received video for captioning. The sub-modules include a sub-sampling module (not separately shown), which extracts a subset of the frames from each of the seconds of the video. In some examples, a frame is sub-sampled every half a second so that for a ten-minute video, the sub-sampling module extracts a total of 1200 frames. The sub-module further includes a feature point extraction module (not separately shown) that extracts features from each of the extracted frames. In some example, the extracted features correspond to the 1-D appearance and optical flow features from each of the extracted frames. In some examples, the 1-D appearance features may be extracted using the Flatten-673 layer of the ResNet-200 network. The ResNet-200 network is described in further detail in He, et al. "Deep Residual Learning for Image Recognition," CVPR, 2016, which is hereby incorporated by reference in its entirety. In some examples, the optical flow features may be extracted from five contiguous frames and encoded using the BN-Inception network with the output taken from the global pool layer. The BN-Inception network is described in further detail in Ioffe, et al. "Batch Normalization: Accelerating Deep Network Training by Reducing Internal Covariate Shift," ICML, 2015, which is hereby incorporated by reference in its entirety. In some examples, both the ResNet-200 and BN-Inception networks may be pre-trained using the ActivityNet dataset. The ActivityNet dataset is described in further detail in Heilbron, et al. "ActivityNet: A Large-scale Video Benchmark for Human Activity Understanding," CVPR, 2015, which is hereby incorporated by reference in its entirety. In some examples, the features extracted by the ResNet200 and BN-Inception networks may include 3072 features from each of the frames. In some examples, the extracted features may be further reduced to 1024 features from each of the frames. The extracted features may also have positional encoding added to them so that the relative temporal position of the extracted features from within the video may be preserved. In some examples, the positional encoding may be encoded according to Equation 1, where Pos is the positional encoding, p is the position of the input feature, i is the position of the output feature, and d is the dimension of the output features. In some examples, for an input with length 100 for which a positional encoding with 150 positions, p varies from 0 to 99, i varies from 0 to 149, and d is 150. In some examples, the dimension of the output features for input embedding module is 2048.

$$Pos(p, i) = \begin{cases} \sin(p/10000^{i/d}) & i \text{ is even} \\ \cos(p/10000^{\lfloor i/d \rfloor}) & \text{otherwise} \end{cases} \quad \text{Equation 1}$$

In some embodiments, input embedding module 110 may further include an additional 1-D dropout layer. In some examples, the 1-D dropout layer is a recurrent dropout layer. In some examples, the dropout ratios are set to 0.1.

The extracted features are then passed to a video encoder stack 120. Video encoder stack 120 is a multi-layer attention-based network as is described in further detail below with respect to FIGS. 2 and 3. The first layer of video encoder stack 120 receives its input from input embedding module 110, each successive layer of video encoder stack 120 receives its input from the output of the previous layer, and the output of the last layer is passed to a proposal decoder 130. The output of each layer of video encoder stack 120 is further passed to a masking unit 140 as is described in further detail below. In some examples, video encoder stack 120 includes two layers, although other numbers of layers are possible including three, four, or more layers.

Proposal decoder 130 includes a ProcNets network with the sequential prediction module removed. The ProcNets network is described in further detail in Zhou, et al. "Towards Automatic Learning of Procedures from Web Instructional Videos," AAAI, 2018, which is hereby incorporated by reference in its entirety. The ProcNets network includes a multi-layer temporal convolutional network. In some examples, the ProcNets network includes three 1-D convolutional layers with batch normalization that uses rectified linear unit (ReLU) activation in the hidden layers. In some examples, the ProcNets network is further modified to use a convolutional stride that depends on kernel size according to Equation 2, where s is a scaling factor. In some examples, basing the convolutional stride on the kernel size reduces the number of longer proposals generated by proposal decoder 130 so that training samples are more balanced and overlap with the ground truth proposals is improved. In some examples, basing the convolutional stride on the kernel size further speeds up the training due to the reduction in the number of longer proposals. In some examples, the temporal convolution kernels in the ProcNets network at set to 1, 2, 3, 4, 5, 7, 9, 11, 15, 21, 29, 41, 57, 71, 111, 161, 211, and 250 and the scaling factor is 50.

$$\text{stride} = \left\lceil \frac{kernelsize}{s} \right\rceil \qquad \text{Equation 2}$$

Proposal decoder 130 generates proposals for each of the anchor events in the video that is characterized by an event proposal score (e.g., a probability that the associated event is in the video) $P_e \in [0,1]$ and both a center offset $\theta_e$ within the video and a length offset $\theta_l$ that describes the length of the event. The associated anchor for the event is characterized with a length $l_a$ and a center $c_a$. The center offset $\theta_l$ and length offset $\theta_l$ of the event and the $l_a$ and a center $c_a$ of the anchor define the start $S_e$ and end $E_e$ for the event according to Equation 3.

$$c_p = c_a + \theta_c l_a$$
$$l_p = l_a e^{\theta_l}$$
$$S_p = c_p - 0.5 l_p$$
$$E_p = c_p + 0.5 l_p \qquad \text{Equation 3}$$

Each proposal generated by proposal decoder 130 is used to generate a proposal mask that is used to mask the outputs from video encoder stack 120 before providing the outputs from video encoder stack 120 to a caption decoder stack 160. The proposal mask converts the otherwise binary proposal from the ProcNets network into a differentiable event mask $M \in \mathbb{R}^T$ for each time step $i \in \{1, \ldots, T\}$ by taking the positional encoding from the anchor and the predicted boundary conditions to provide a continuous and differentiable mask. The differentiable proposal mask is generated according to Equations 1 and 4-6 where g is a continuous function. In some examples, g is parameterized using a multi-layer perceptron network. In some examples, the mask does not need to be learned because proposal decoder 130 already provides a reasonable boundary prediction so that the gated formulation of Equation 7 may be used to generate the differentiable proposal mask. In practice, the proposal mask is near zero outside the predicted starting $S_p$ and ending $E_p$ positions and near one between the predicted starting $S_p$ and ending $E_p$ positions.

$$f_M(S_p, E_p, S_a, E_a, i) = \qquad \text{Equation 4}$$
$$\log sig(g(Pos(S_p, i), Pos(E_p, i), Bin(S_a, E_a, i)))$$

$$Bin(S_a, E_a, i) = \begin{cases} 1 & \text{if } i \in [S_a, E_a] \\ 0 & \text{otherwise} \end{cases} \qquad \text{Equation 5}$$

$$S_a = c_a - 0.5 l_a \qquad \text{Equation 6}$$
$$E_a = c_a + 0.5 l_a$$

$$f_{GM}(S_p, E_p, S_a, E_a, i) = \qquad \text{Equation 7}$$
$$P_e Bin(S_a, E_a, i) + (1 - P_e) f_M(S_p, E_p, S_a, E_a, i)$$

In some embodiments, because proposal decoder 130 generates multiple proposals, only those proposals with a highest score $P_e$ are used for the generation of captions. In some examples, only the proposals with the ten highest scores $P_e$ are used. Each of the proposals generated by proposal decoder 130 is separately used to mask the outputs from video encoder stack 120 using masking unit 140 by point-wise multiplying the outputs from video encoder stack 120 with the corresponding proposal mask entries. The masked outputs from video encoder stack 120 are then provided to a caption decoder stack 160 as is described in further detail below. That is, dense video captioning system 100 iterates through each of the proposals and generates a caption separately for each.

Dense video captioning system 100 further includes an output embedding module 150. Similar to input embedding module 110, output embedding module 150 receives positional encoding information to provide a temporal context or ordering to the caption text that is generated iteratively by caption decoder stack 160 and an output layer 170. In some examples, the positional encoding used by output embedding module 150 is generated according to Equation 1. The output from output embedding module 150 is provided to caption decoder stack 160 and consists of each of the previously generated output words from the caption (e.g., from previous iterations) shifted by one word and including the positional encoding. In some examples, the set of generated output words is initialized using a starting seed word.

Caption decoder stack 160 is a multi-layer attention-based network as is described in further detail below with respect to FIGS. 2 and 3. The first layer of caption decoder stack 160 receives its input from output embedding module 150, each successive layer of caption decoder stack 160 receives its input from the output of the previous layer, and the output of the last layer is passed to output layer 170. Each layer of caption decoder stack 160 further receives the video encoding from a corresponding layer in video encoder stack 120 that is masked, by masking unit 140, according to the current proposal being captioned. In some examples, caption decoder stack 160 includes two layers, although other numbers of layers are possible including three, four, or more layers. In some examples, video encoder stack 120 and caption decoder stack 160 include a same number of layers.

Output layer 170 includes a linearization network followed by a softmax layer.

Collectively the linearization network and softmax layer linearize the output from the last layer of caption decoder stack 160 and then compress the outputs to the range of [0,1] in order to add the next word in the caption text consistent with the previous iterations of the generated caption text. The softmax transfer function is described in Equation 8, which describes generation of the jth of the output values for a vector z.

$$\mathrm{softmax}(z)_j = \frac{e^{(z_j)}}{\sum e^{(z_j)}} \qquad \text{Equation 8}$$

According to some embodiments, video encoder stack 120, caption decoder stack 160, and output layer 170 are collectively referred to as a transformer. Transformer architectures are described in further detail in Vaswani, et al. "Attention is All You Need," NIPS, 2017, which is hereby incorporated by reference in its entirety.

Using a differentiable proposal mask in proposal decoder 130 provide advantages over conventional approaches that use just the binary proposal mask. For example, the differentiable proposal mask allows for the back propagation of error during training from caption decoder stack 160 to not just video encoder stack 120 (so that captioning errors are usable to train the video encoding), but also the back propagation of error during training from caption decoder stack 160 to proposal decoder 130 (so that captioning errors are also usable to train the proposal decoding). This provides for end-to-end training in dense video captioning system 100 that is not possible in previous dense video captioning system, which used only the error between the generated proposal and the ground truth proposals in the training data.

Figure 2:
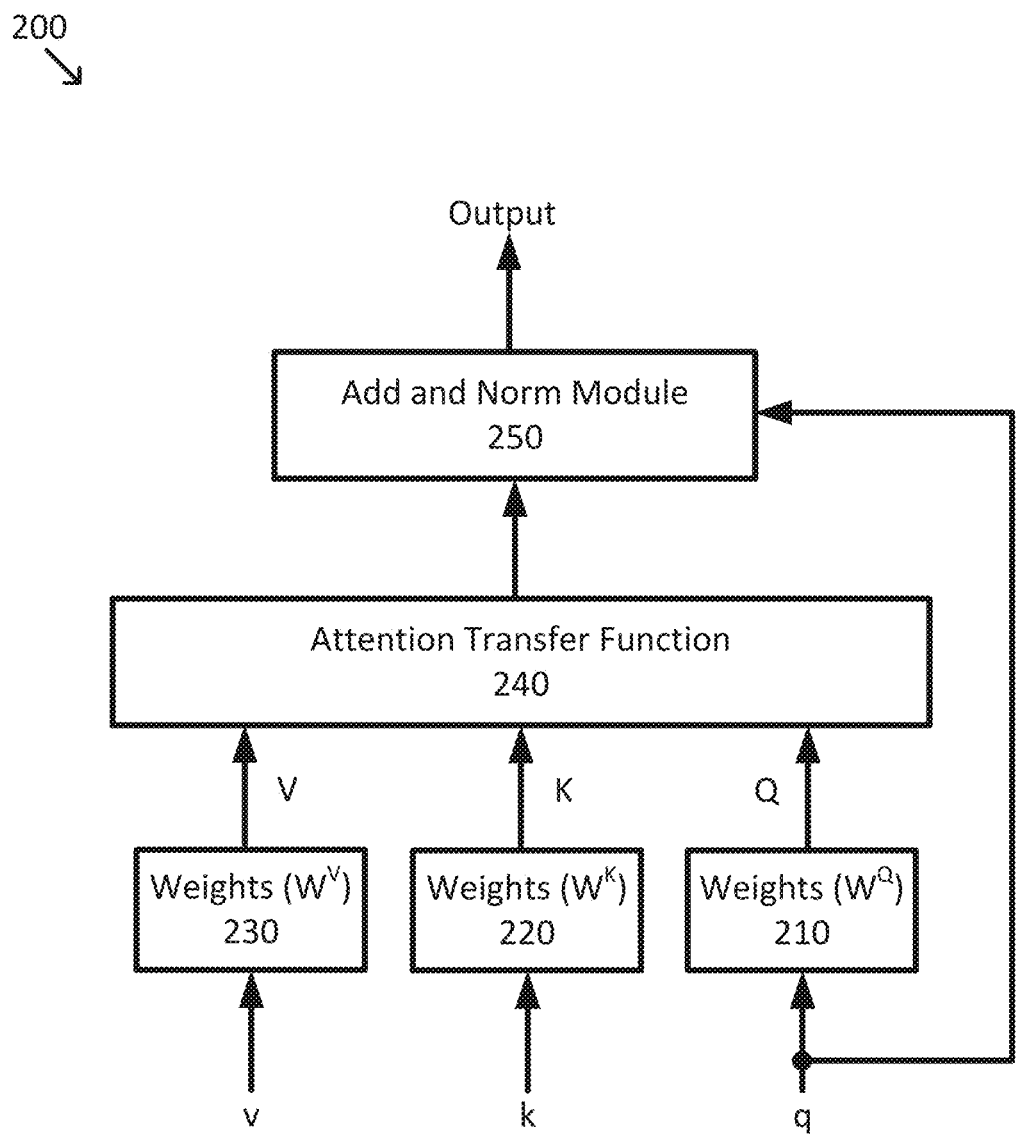
FIG. 2 is a simplified diagram of an attention network according to some embodiments.

FIG. 2 is a simplified diagram of an attention network 200 suitable for use in video encoder stack 120 and caption decoder stack 160 according to some embodiments. As shown in FIG. 2, attention network 200 receives a query $q \in \mathbb{R}^{d_q}$, a key $k \in \mathbb{R}^{d_k}$, and a value $v \in \mathbb{R}^{d_v}$. Each of the q, k, and v are subject to respective weights $W^Q$ 210, $W^K$ 220, and $W^V$ 230 according to Equations 9-11. The weights $W^Q$ 210, $W^K$ 220, and $W^V$ 230 are altered during training using back propagation.

$$Q = qW^Q \in \mathbb{R}^{d_q} \qquad \text{Equation 9}$$

$$K = kW^K \in \mathbb{R}^{d_k} \qquad \text{Equation 10}$$

$$V = vW^V \in \mathbb{R}^{d_v} \qquad \text{Equation 11}$$

The resulting Q, K, and V vectors are passed through an attention transfer function 240, which generates a dot product of Q and K, which is then applied to V according to Equation 12.

$$\mathrm{Attention}(Q, K, V) = \mathrm{softmax}\left(\frac{QK^T}{\sqrt{d_k}}\right)V \in \mathbb{R}^{d_v} \qquad \text{Equation 12}$$

An addition and normalization module 250 is then used to combine the query q with the output from attention transfer function to provide a residual connection that improves the rate of learning by attention network 200. Addition and normalization module 250 implements Equation 13 where μ and σ are the mean and standard deviation, respectively, of the input vector and $g_i$ is gain parameter for scaling the layer normalization. The output from addition and normalization module 250 is the output of attention network 200.

$$\mathrm{LayerNorm}(\mathrm{Attention}(Q, K, V) + q) \qquad \text{Equation 13}$$
$$\mathrm{LayerNorm}(a_i) = g_i \frac{a_i - \mu}{\sigma}$$

Attention network 200 is often used in two variant forms. The first variant form is a multi-head attention layer where multiple attention networks consistent with attention network 200 are implemented in parallel, which each of the "heads" in the multi-head attention network having its own weights $W^Q$ 210, $W^K$ 220, and $W^V$ 230, which are initialized to different values and thus train to learn different encodings. The outputs from each of the heads are then concatenated together to form the output of the multi-head attention layer. The second variant form is a self-attention layer that is a multi-head attention layer where the q, k, and v inputs are the same for head of the attention network 200 in each of the heads.

Figure 3:
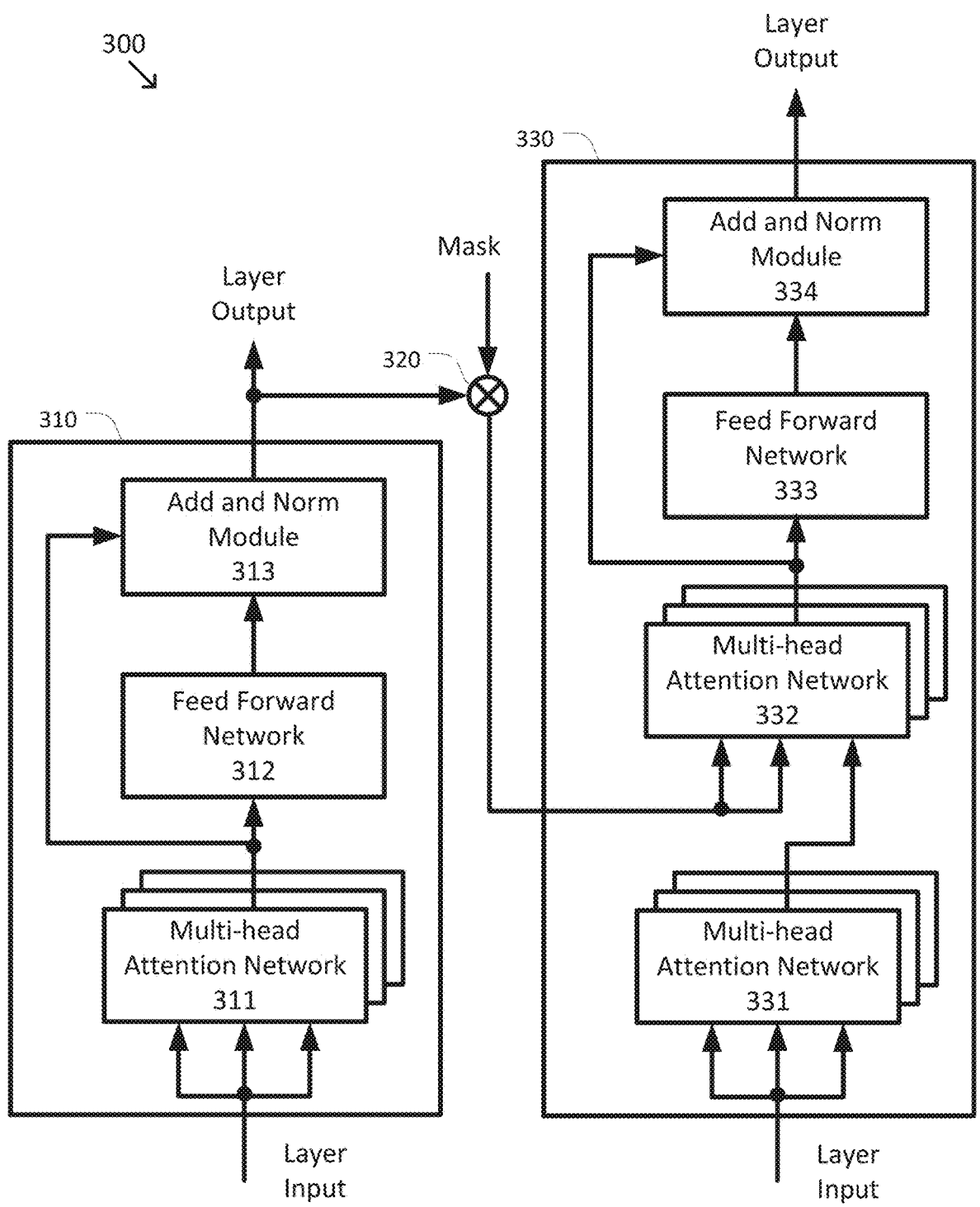
FIG. 3 is a simplified diagram of a layer of a masked transformer for encoding according to some embodiments.

FIG. 3 is a simplified diagram of a layer 300 of a masked transformer for encoding according to some embodiments. As shown in FIG. 3, layer 300 includes an encoding layer 310, a masking unit 320, and a decoding layer 330.

Encoding layer 310 receives layer input (e.g., from an input network for a first layer in an encoding stack or from layer output of a next lowest layer for all other layers of the encoding stack) and provides it to all three (q, k, and v) inputs of a multi-head attention layer 311, thus multi-head attention layer 311 is configured as a self-attention network. Each head of multi-head attention layer 311 is consistent with attention network 200. In some examples, multi-head attention layer 311 includes eight heads, however, other numbers of heads such as two to seven or more than eight are possible. The output of multi-head attention layer 311 is provided to a feed forward network 312 with both the input and output of feed forward network 312 being provided to an addition and normalization module 313, which generates the layer output for encoding layer 310. In some examples, feed forward network 312 is a two-layer perceptron network, which implements Equation 14 where γ is the input to feed forward network 312 and $M_i$ and $b_i$ are the weights and biases respectively of each of the layers in the perceptron network. In some examples, addition and normalization module 313 is substantially similar to addition and normalization module 250. In some examples, encoding layer 310 is consistent with a layer from video encoding stack 120.

$$FF(\gamma) = \max(0, \gamma M_1 + b_1)M_2 + b_2 \qquad \text{Equation 14}$$

The layer outputs from encoding layer 310 are then masked according to a differentiable mask generated for the current proposal using masking unit 320. In some examples, masking unit 320 is consistent with masking unit 140.

Decoding layer 330 receives layer input (e.g., from an input network for a first layer in a decoding stack or from layer output of a next lowest layer for all other layers of the decoding stack) and provides it to all three (q, k, and v) inputs of a multi-head attention layer 331, thus multi-head attention layer 331 is configured as a self-attention network. Each head of multi-head attention layer 331 is consistent with attention network 200. In some examples, multi-head attention layer 331 includes eight heads, however, other numbers of heads such as two to seven or more than eight are possible. The output of multi-head attention layer 311 is provided as the q input to another multi-head attention layer 332 and the k and v inputs of multi-head attention layer 332 are provided with the masked encoding from masking unit 320. Each head of multi-head attention layer 321 is consistent with attention network 200. In some examples, multi-head attention layer 332 includes eight heads, however, other numbers of heads such as two to seven or more than eight are possible. The output of multi-head attention layer 332 is provided to a feed forward network 333 with both the input and output of feed forward network 333 being provided to an addition and normalization module 334, which generates the layer output for encoding layer 310. In some examples, feed forward network 333 and addition and normalization module 334 are substantially similar to feed forward network 312 and addition and normalization module 313, respectively. In some examples, decoding layer 330 is consistent with a layer from caption decoder stack 160.

In some embodiments, because multi-head attention layer 311 in in each of the layers of video encoder stack 120 is configured as a self-attentions layer, there is just a single layer of encoding that has access across the entire span of the input video data as well as the encodings from the intermediary layers. Thus, video encoder stack 120 is better able to learn potential dependencies between frames of the video that are more temporally distant without suffering from the slow learning of recurrent networks typically used to process video.

Figure 4:
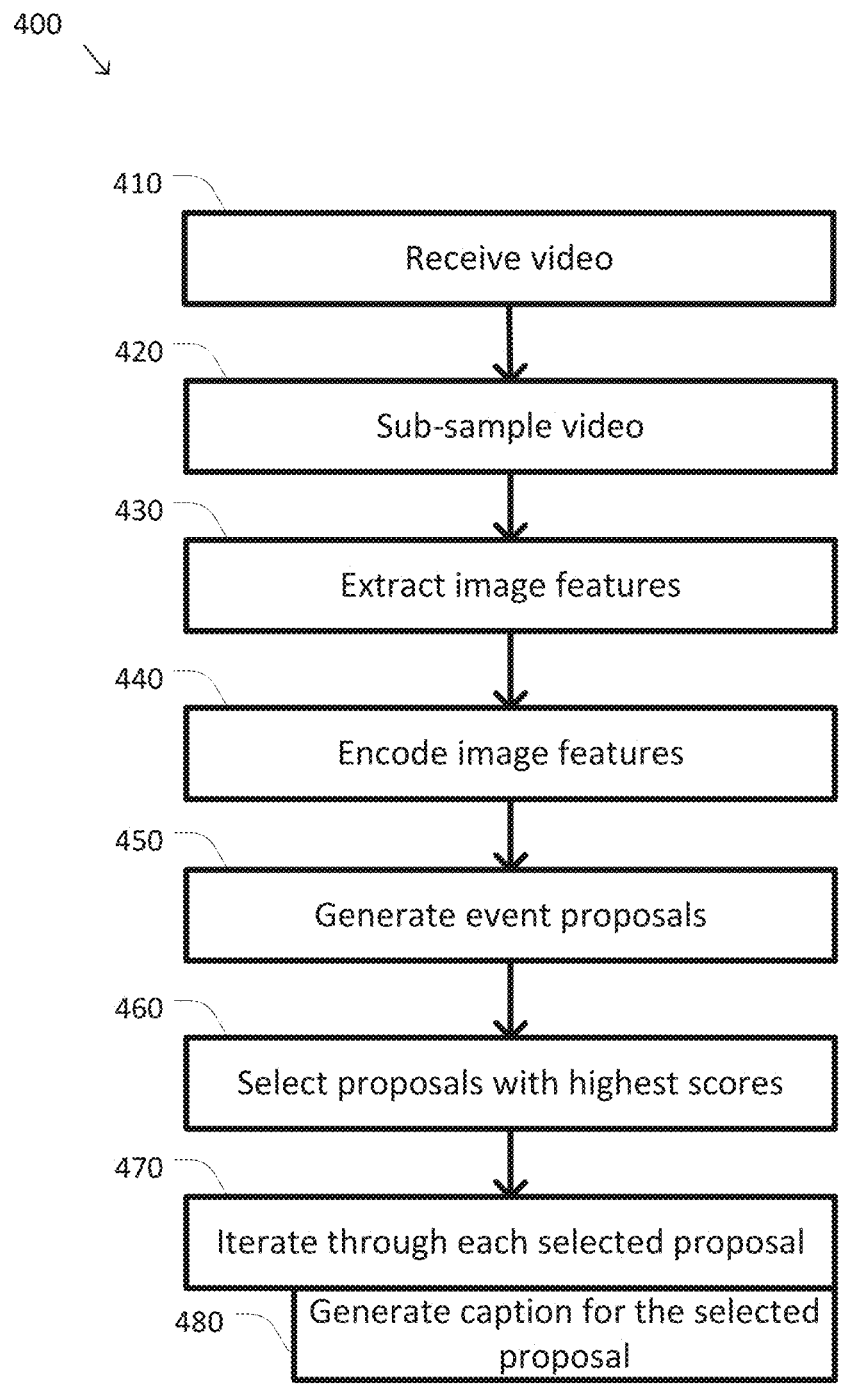
FIG. 4 is a simplified diagram of a method of training the dense video captioning system of FIG. 1 according to some embodiments.

FIG. 4 is a simplified diagram of a method 400 of training dense video captioning system 100 according to some embodiments. One or more of the processes 410-480 of method 400 may be implemented, at least in part, in the form of executable code stored on non-transitory, tangible, machine-readable media that when run by one or more processors may cause the one or more processors to perform one or more of the processes 410-480. According to some embodiments, method 400 may be repeatedly used as part of a larger supervised training process where a large number of training videos are each presented in turn to dense video captioning system 100 with training occurring according to method 400. In some examples, each of the videos may be presented multiple times during the training with each presentation of the set of videos corresponding to a training epoch.

At a process 410, a video is received. In some examples, the video is stored in file form on a storage media accessible to dense video captioning system 100. Also included with the video are ground truth proposals for the events depicted in the video and ground truth captions for each of the events for which a ground truth proposal is provided.

At a process 420, the video is sub-sampled. In some examples, the sub-sampling includes extracted one frame from the video every half a second. In some examples, the sub-sampling reduces the volume of the video data so that the model sizes of the networks in dense video captioning system 100 may be kept reasonable.

At a process 430, image features are extracted from each of the sub-sampled video frames. In some examples, the modified ResNet-200 and BN-Inception networks of input embedding module 110 are used to extract the image features. In some examples, 1024 image features are extracted from each frame. The extracted image features and then combined with a positional encoding by input embedding module 110 to preserve temporal information associated with the extracted image features.

At a process 440, the extracted image features are encoded. In some examples, the encoding is performed by video encoder stack 120 with the extracted image features being fed forward through the layers of video encoder stack 120 according to the current weights and parameters in each of the layers of video encoder stack 120. In some examples, each of the layers in video encoder stack 120 is consistent with encoding layer 310.

At a process 450, event proposals are generated. In some examples, the encoded image features from the last layer of video encoder stack 120 are provided to proposal decoder 130. Proposal decoder 130 generates a candidate set of event proposals by feeding forward the encoded image features from the last layer of video encoder stack 120 through the modified ProcNets network. Each of the candidate event proposals is associated with a proposal score $P_e$, which reflects its strength as a possible event within the video.

At a process 460, the proposals from the set of candidate proposals with the highest proposal scores are selected for further processing. In some examples, the candidate proposals with the ten highest scores are selected. In some examples, the candidate proposals may be sorted according to the proposal score $P_e$ to identify the highest scoring of the candidate proposals. In some examples, proposal decoder 130 may generate only the highest scoring proposals.

At a process 470, each of the set of candidate proposals selected during process 460 is iterated through and a candidate caption is generated for each of the selected proposals using a process 480.

Figure 5:
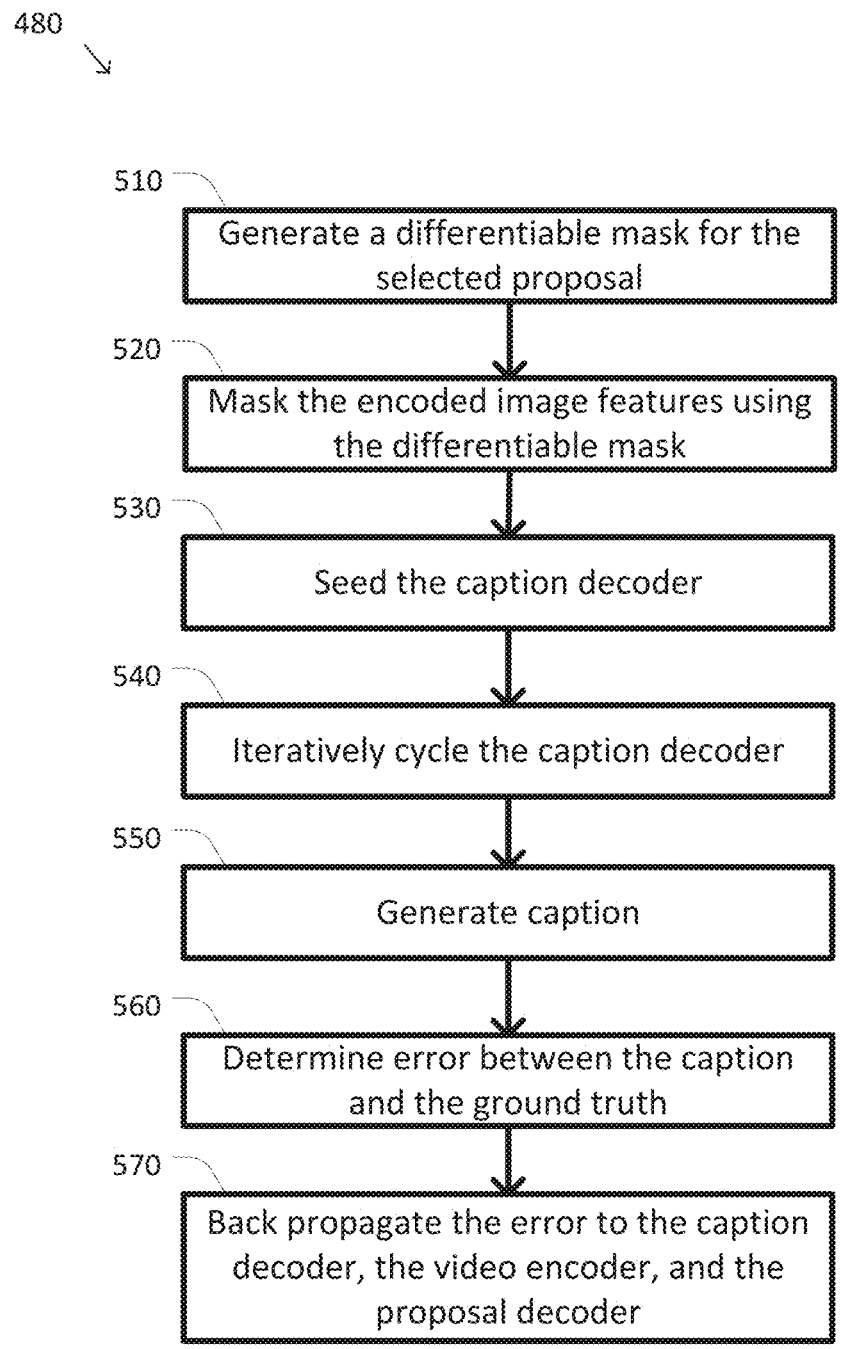
FIG. 5 is a simplified diagram of a process for generating a caption from a proposal according to some embodiments.

FIG. 5 is a simplified diagram of a process 480 for generating a caption from a proposal according to some embodiments. As shown in FIG. 5, process 480 includes sub-processes 510-570. One or more of the sub-processes 510-570 may be implemented, at least in part, in the form of executable code stored on non-transitory, tangible, machine-readable media that when run by one or more processors may cause the one or more processors to perform one or more of the sub-processes 510-570. In some examples, the proposal being processed by process 480 is the selected proposal that is the subject of the current iteration of process 470.

At a sub-process 510, a differentiable mask is generated for the selected proposal. In some examples, the differentiable mask is used to convert the proposal into a fully differentiable form so that proposal decoder 130 may be trained based on back propagation of error from caption decoding stack as is discussed further below. In some examples, the differentiable mask may be generated from the selected proposal according to Equations 1 and 4-6. According to some embodiments and depending upon the training approach, the differentiable mask is generated according to the selected proposal as output from proposal decoder 130 or alternatively from the corresponding ground truth proposal.

At a sub-process 520, the encoded image features are masked using the differentiable mask generated during sub-process 510. By masking the encoded image features with the differentiable mask, only those encoded image features associated with the interval that corresponds to the selected proposal are included in the caption decoding. In some examples, the masking is performed by masking unit 320 so that encoded image features from each of the layers in video encoder stack are masked before being provided to corresponding layers of caption decoder stack 160.

At a sub-process 530, the caption decoder is seeded. The caption decoder is seeded by providing a fixed special token that indicates a start of a caption. In some examples, the fixed special token indicating the start of a caption may correspond to a tag, such as "<s>".

At a sub-process 540, the caption decoder is cyclically iterated. For each iteration of the caption decoder, the current candidate string of words for the caption are embedded with positional encoding information using output embedding module 150 in order to preserve the ordering of the words in the caption. The candidate string of words for the caption along with the positional encoding information are then fed forward through the layers of caption decoder stack 160 according to the current weights and parameters in each of the layers of caption decoder stack 160. At each layer of caption decoder stack 160, the partially decoded caption is combined with the masked and encoded image features from the corresponding layer of video encoder stack. The output of the final layer of caption decoder stack 160 is then provided to output layer 170, which generates the next iteration of the caption, which is fed back as the input to the next iteration of the caption decoder. In some examples, the iteration continues until the caption decoder converges to a complete caption where a fixed special token indicating an end to the caption is generated and added to the caption. In some examples, the fixed special token indicating the end of the caption may correspond to a tag, such as "</s>". In some examples, the iterations continue until a configurable maximum number of words are added to the caption.

At a sub-process 550, the caption is generated. After the final iteration of the caption decoder by sub-process 540, the finalized caption may be generated by converting the encoding of the caption used by the caption decoder to natural language words. In some examples, the fixed special token added by process 530 to seed the caption and/or the fixed special token added by process 540 at the end of the caption are additionally removed.

At a sub-process 560, an error between the generated caption and the ground truth caption for the video received during process 410 and the selected proposal being used by the current iteration of process 470 is determined. In some examples, the error may be determined from differences between the encoding for the caption generated by sub-process 540 and the encoding of the ground truth caption for the corresponding video and proposal. In some examples, the error may be determined according to Equation 15, where $P_e$ is the predicted current event, $\hat{P}_e$ is the ground truth for the current event, $\hat{\theta}_c$ and $\hat{\theta}_l$ are the ground truth center and length of the current event, BCE is the binary cross-entropy function, CE is the cross entropy function, $y_t$ is the value of the t-th word in the ground truth caption, $\lambda_1$-$\lambda_4$ are the coefficients for balancing the various error components, and Smooth$_{l1}$ is described in Girshick, "Fast R-CNN," *Proceedings of the 2015 IEEE International Conference on Computer Vision*, at 1440-1448, which is incorporated by reference herein in its entirety.

$$L_r = \text{Smooth}_{l1}(\hat{\theta}_c, \theta_c) + \text{Smooth}_{l1}(\hat{\theta}_1, \theta_1)$$
$$L_m^i = BCE(Bin(S_g, E_g, i), f_M(S_p, E_p, S_a, E_a, i))$$
$$L_e = BCE(\hat{P}_e, P_e)$$
$$L_c^t = CE(\hat{y}_t, p(y_t | X))$$
$$L = \lambda_1 L_r + \lambda_2 \sum_i L_m^i + \lambda_3 L_e + \lambda_4 \sum_t L_c^t$$

Equation 15

At a sub-process 570, the error is back propagated to the caption decoder, the video encoder, and the proposal decoder. The error is back propagated through output layer 170 to each of the layers in caption decoder stack 160. The error is then further back propagated from each of the layers in caption decoder stack 160 to proposal decoder 130 and to the corresponding layers in video encoder stack 120. The error may be back propagated from caption decoder stack 160 to proposal decoder 130 because a differential mask is used for the proposal. The error may then be further back propagated through proposal decoder 130 and then from proposal decoder through each of the layers in video encoder stack 120. The video encoder stack 120 further back propagates the error from the layers of caption decoder stack 160.

As discussed above and further emphasized here, FIGS. 4 and 5 are merely examples which should not unduly limit the scope of the claims. One of ordinary skill in the art would recognize many variations, alternatives, and modifications. According to some embodiments, the error between the event proposals generated by process 450 and the ground truth proposals for the video may also be back propagated to provide additional training for proposal decoder 130 and/or video encoder stack 120.

According to some embodiments, method 400 may be modified to generate captions for videos using the trained dense video captioning system 100. In some examples, a video, including a video without accompanying ground truth proposals or ground truth captions, to be captioned may be processed according to processes 410-480 and sub-processes 510-550 to generate captions for the video.

Figure 6:
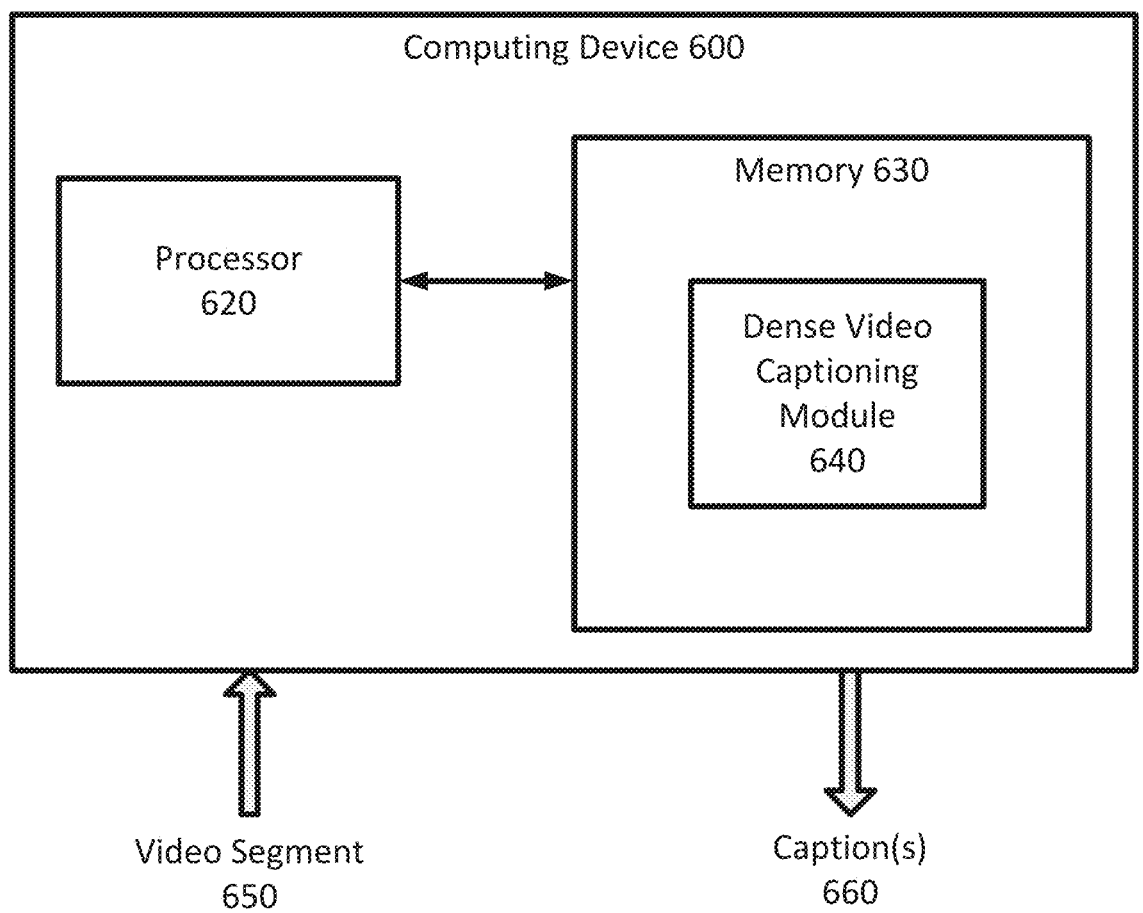
FIG. 6 is a simplified diagram of a computing device according to some embodiments.

FIG. 6 is a simplified diagram of a computing device 600 according to some embodiments. As shown in FIG. 6, computing device 600 includes a processor 620 coupled to memory 620. Operation of computing device 600 is controlled by processor 620. And although computing device 600 is shown with only one processor 620, it is understood that processor 620 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 630 may be used to store software executed by computing device 600 and/or one or more data structures used during operation of computing device 600. Memory 630 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 620 and/or memory 630 may be arranged in any suitable physical arrangement. In some embodiments, processor 620 and/or memory 630 may be implemented on a same board, in a same package (e.g., system-in-package), on a same chip (e.g., system-on-chip), and/or the like. In some embodiments, processor 620 and/or memory 630 may include distributed, virtualized, and/or containerized computing resources. Consistent with such embodiments, processor 620 and/or memory 630 may be located in one or more data centers and/or cloud computing facilities.

As shown, memory 630 includes a dense video captioning module 640 that may be used to implement and/or emulate dense video captioning system 100. Dense video captioning module 640 may also handle the iterative training and/or evaluation of dense video captioning system 100 according to training method 400 of FIG. 4. Dense video captioning module 640 may also handle the generation of captions from videos. In some examples, memory 630 may include non-transitory, tangible, machine readable media that includes executable code that when run by one or more processors (e.g., processor 620) may cause the one or more processors to perform the processes of method 400. And although dense video captioning module 640 is depicted as a software module, dense video captioning module 640 may be implemented using hardware, software, and/or a combination of hardware and software. As shown, computing device 600 receives a video segment 650, which is provided to dense video captioning module 640 which generates one or more captions. 660.

Dense video captioning system 100 and training method 400, by using the differentiable proposal masks and subsequent end-to-end training, are able to generate better event proposal and better captioning results than other dense video captioning approaches that do not use the transformer of dense video captioning system 100 or the end-to-end training.

Figures 7, 8:
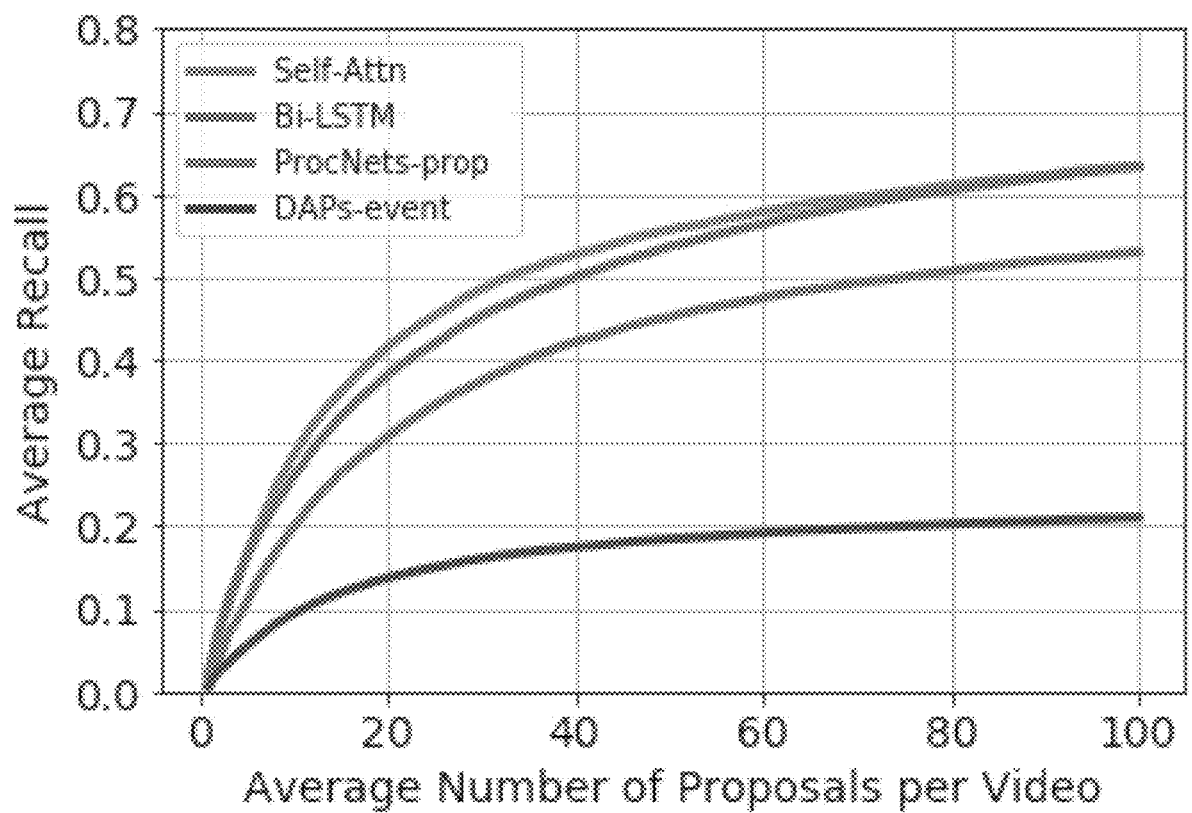
FIGS. 7 and 8 are simplified diagrams of improved performance for event proposal recall according to some embodiments.

FIGS. 7 and 8 are tables and charts improved performance for event proposal recall according to some embodiments. As shown in FIGS. 7 and 8, dense video captioning system 100 and training method 400 ("Transformer") outperform the standard ProcNets prop model, a similarly configured Bi-directional Long Short-Term Memory ("Bi-LSTM") network, and a Deep Actions Proposal ("DAPs-event") approach on the average recall metric, especially for videos with smaller average numbers of proposals, for videos from the ActivityNet dataset.

FIGS. 9-11 are simplified diagrams of improved performance for caption generation according to some embodiments. As shown in FIG. 9, dense video captioning system 100 and training method 400 outperform the similarly configured Bi-LSTM network for videos and captions from the ActivityNet dataset according to both the BLEU and METEOR metrics. FIG. 10 shows similar outperformance dense video captioning system 100 and training method 400 of Bi-LSTM for videos from the YouCookIt dataset for training based on feed forward of both the ground truth ("GT") and learned proposals to mask the encoded video features during training. FIG. 11 shows significant outperformance by dense video captioning system 100 and training method 400 of Bi-LSTM for videos from the ActivityNet dataset having events of at least 50 seconds in length.

Figure 12:
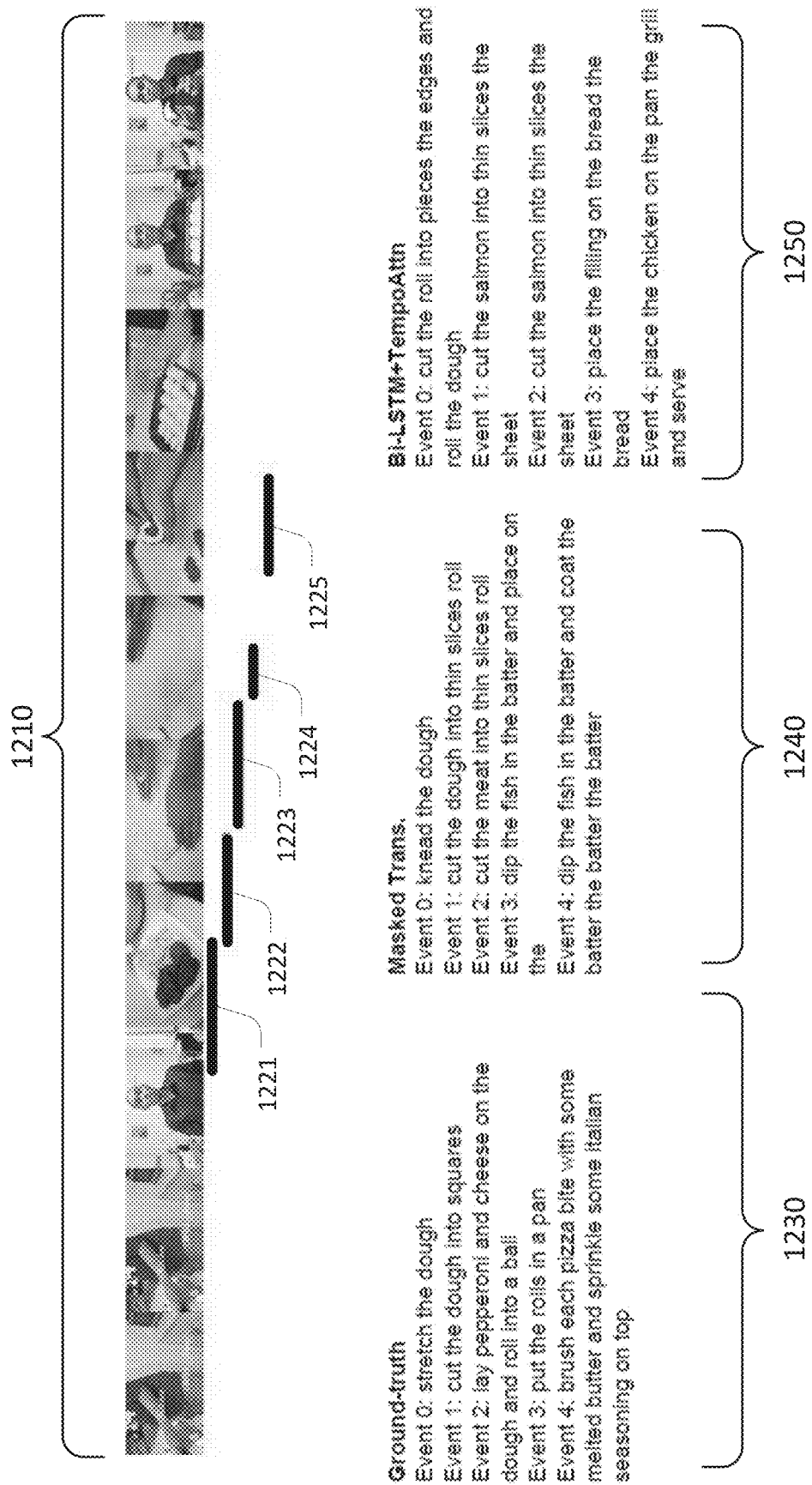
FIG. 12 is an example of dense video captioning according to some embodiments.

FIG. 12 is an example of dense video captioning according to some embodiments. FIG. 12 shows representative frames 1210 from a video of cooking to be captioned. Also shown are the time intervals 1221-1225 that correspond to the five events included in the video. For each of the events, a ground truth caption 1230 is also shown, which corresponds to the ground truth caption that could be used if the depicted video is used as a training example during method 400. The captions 1240 for each of the five events that are generated by dense video captioning system 100 as trained by method 400 are also shown along with the captions 1250 generated by the similarly configured Bi-LSTM network. As can be seen, dense video captioning system 100 as trained by method 400 generates better captions than the similarly configured Bi-LSTM network.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the breadth and scope of the present application should not be limited by any of the embodiments described herein, but should be defined only in accordance with the following and later-submitted claims and their equivalents.

What is claimed is:

1. A system for generating dense captioning for a video, the system comprising:
   an encoder configured to encode information extracted from a plurality of video frames to generate one or more outputs;
   a proposal decoder configured to receive the one or more outputs from the encoder and to generate one or more proposals;
   a masking unit configured to iteratively mask the one or more outputs from the encoder according to one or more proposals generated by the proposal decoder; and
   a decoder configured to iteratively receive the masked one or more outputs from the encoder for each of the one or more proposals and to generate one or more outputs;
   the system being configured to generate a dense captioning for the video for each of the one or more proposals based on the one or more outputs of the decoder.

2. The system of claim 1, wherein the one or more outputs from the proposal decoder include a differentiable mask.

3. The system of claim 2, wherein, during training, error in the dense captioning is back propagated to the decoder, the encoder, and the proposal decoder.

4. The system of claim 1, wherein the encoder comprises a self-attention layer and a feed forward network.

5. The system of claim 4, wherein the self-attention layer is configured to encode features across the plurality of video frames.

6. The system of claim 1, wherein output from the encoder is coupled to the proposal decoder.

7. The system of claim 1, comprising a convolutional neural network for extracting the information from the plurality of video frames.

8. The system of claim 1, wherein the proposal decoder comprises a temporal convolutional network.

9. The system of claim 1, wherein the decoder comprises a self-attention layer, a multi-head attention layer, and a feed forward network.

10. A non-transitory machine-readable medium comprising a plurality of machine-readable instructions which, when executed by one or more processors, are adapted to cause the one or more processors to perform a method for generating dense captioning for a video comprising:
encoding information extracted from a plurality of video frames to generate one or more encoding outputs;
generating one or more proposals based on the one or more encoding outputs;
generating, for each of the one or more proposals, a differentiable mask;
iteratively masking the one or more encoding outputs according to the one or more proposals;
generating one or more words descriptive of the plurality of video frames based on the masked encoding outputs; and
generating a dense captioning for the plurality of video frames based on the one or more generated words.

11. The non-transitory machine-readable medium of claim 9, wherein, during training, error in the dense captioning is back propagated.

12. The non-transitory machine-readable medium of claim 9, wherein encoding comprises:
receiving as input the information extracted from the plurality of video frames;
determining a self-attention based on the received input; and
feeding the determined self-attention forward.

13. The non-transitory machine-readable medium of claim 9, wherein generating the one or more proposals comprises performing a temporal convolution on the encoding outputs.

14. The non-transitory machine-readable medium of claim 9, wherein generating the one or more words comprises:

determining a self-attention of an output;
determining a multi-head attention based on the self-attention and the masked outputs; and
feeding the determined multi-head attention forward.

15. A method comprising:
encoding, using an encoder, information extracted from a plurality of video frames to generate one or more outputs;
generating, using a proposal decoder, one or more proposals based on the encoding;
generating, for each of the one or more proposals, a differentiable mask;
iteratively masking, by a masking unit, the one or more outputs from the encoder according to the one or more proposals generated by the proposal decoder;
generating, using a decoder, one or more words descriptive of the plurality of video frames based on the masked outputs from the encoder; and
generating a dense captioning for the plurality of video frames based on the one or more words.

16. The method of claim 15, further comprising, during training, back propagating error in the dense captioning to the decoder, the encoder, and the proposal decoder.

17. The method of claim 15, wherein encoding comprises:
receiving as input the information extracted from the plurality of video frames;
determining a self-attention based on the received input; and
feeding the determined self-attention forward using a feed forward network.

18. The method of claim 15, wherein generating the one or more proposals comprises performing a temporal convolution on the outputs from the encoder.

19. The method of claim 15, wherein generating the one or more words comprises:
determining a self-attention of an output from the decoder;
determining a multi-head attention based on the self-attention and the masked outputs; and
feeding the determined multi-head attention forward using a feed forward network.

* * * * *